United States Patent [19]

Debuysscher

[11] Patent Number: 4,881,223

[45] Date of Patent: Nov. 14, 1989

[54] ASYNCHRONOUS TIME DIVISION COMMUNICATION SYSTEM

[75] Inventor: Pierre L. Debuysscher, Nazareth, Belgium

[73] Assignee: Alcatel N.V., Amsterdam, Netherlands

[21] Appl. No.: 169,867

[22] Filed: Mar. 17, 1988

[30] Foreign Application Priority Data

Mar. 18, 1987 [BE] Belgium .................. 8700280

[51] Int. Cl.⁴ .............................................. H04J 3/06
[52] U.S. Cl. .................................. 370/77; 370/100.1
[58] Field of Search ................... 370/77, 62, 60, 94, 370/100, 58, 91

[56] References Cited

U.S. PATENT DOCUMENTS

| | | | |
|---|---|---|---|
| 4,035,580 | 7/1977 | Dieter et al. | 370/91 |
| 4,367,549 | 1/1983 | Vachee | 370/91 |
| 4,589,106 | 5/1986 | Prather et al. | 370/58 |
| 4,594,707 | 6/1986 | Merritt et al. | 370/91 |

FOREIGN PATENT DOCUMENTS 903261 3/1986 Belgium .
905982 6/1987 Belgium .

Primary Examiner—Robert L. Griffin
Assistant Examiner—Wellington Chin
Attorney, Agent, or Firm—Christie, Parker & Hale

[57] ABSTRACT

Asynchronous time division system including at least one node with a switching network (BSN) to which a plurality of user stations (US1/N) are coupled via transmission links and which is adapted to interconnect user stations. At least one (US4) of these user stations is a clock station providing clock information, and upon the establishment of a connection between a plurality of other user stations (US1/3), with the purpose of exchanging synchronous data, each of these stations establishes a connection with this clock station.

9 Claims, 2 Drawing Sheets

ASYNCHRONOUS TIME DIVISION COMMUNICATION SYSTEM

TECHNICAL FIELD

The present invention relates to an asynchronous time division communication system including at least one node with a switching network to which a plurality of user stations are coupled via transmission links, said system being adapted to interconnect user stations.

This application is based on and claims priority from an application first filed in Belgium on Mar. 18, 1987 under Ser. No. 08700280. To the extent such prior application may contain any addition information that might be of any assistance in the use and understanding of the invention claimed herein, it is hereby incorporated by reference.

Such an asynchronous time division communication system is generally known in the art., e.g. from Belgian patent No. 905982 (M. De Prycker, M. De Somer 2—2). In this known system data are transmitted between interconnected user stations and via one or more nodes in the form of data packets. In these stations and nodes this occurs at the bit rate of the local clocks which are asynchronous. This known system is therefore simply not applicable when these user stations wish to exchange synchronous data but rather additional means have to be provided to synchronize these stations.

Such additional means may for instance be constituted by a synchronizing network built on top of the asynchronous communication system and which via transmission links and for instance from a central clock provides timing information to all stations. However, such an additional synchronizing network is expensive because it provides all stations with timing information, i.e. even those who do not need it. This is the more disadvantageous because the number of stations requiring such a timing information, i.e. synchronous stations, will probably considerably decrease in the future. Still another drawback is that the central clock only provides one type of timing information, although the stations could require alternate types of timing information depending on the circumstances. Also, because only a single clock is available it is impossible to form several independent groups of stations and to operate the stations of each group but independently of any other such group. Finally, in order that the synchronizing network should be reliable it has to be provided with expensive security means.

DISCLOSURE OF INVENTION

An object of the present invention is to provide an asynchronous time division communication system of the above described type, but which is provided with simple means to synchronize stations wishing to exchange synchronous data without an additional synchronizing network or other complex and expensive synchronizing means.

This object may be achieved if at least one of said user stations is a clock station which after the establishment of a connection with another user station supplies clock information thereat.

Upon the establishment of a connection between a plurality of other user stations, with the purpose of exchanging synchronous data, each one of them may establish a connection with said clock station.

In this way each user station requiring clock information for the transmission of synchronous data may establish a connection to this clock station. The establishment of this connection is no different from the establishment of a usual connection. This means that the introduction or removal of such a clock station has no influence whatsoever on the design of the system. Moreover, because the clock information is transmitted in the same way as other data, no additional security means need to be provided, but use is made of the security means normally available in the system, such as rerouting and repair. This means that the transmission of clock information is as reliable as the transmission of other data.

The present communication system may include a plurality of clock stations including clock means providing different types of clock information.

In this way each station may select the type of clock information wanted, so that it is for instance possible to form various groups of stations wherein the stations of each group are mutually synchronised to the wanted clock information.

BRIEF DESCRIPTION OF DRAWINGS

The above mentioned and other objects and features of the invention will become more apparent and the invention itself will be best understood by referring to the following description of presently preferred examplary embodiment taken in conjunction with the accompanying drawings wherein.

BEST MODE FOR CARRYING OUT THE INVENTION

Figure 1:
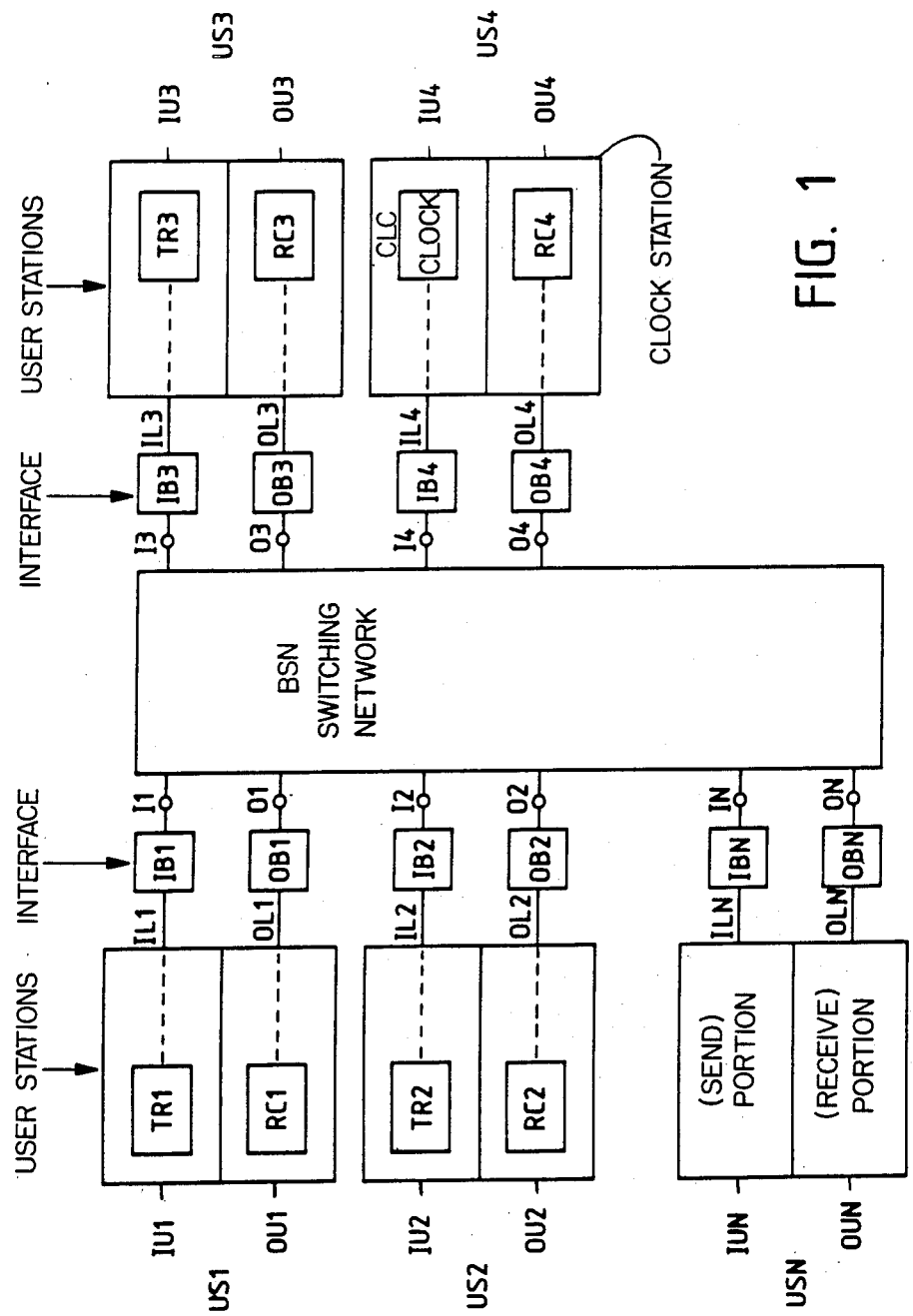
FIG. 1 is a block diagram of a node of an asynchronous time division communication system according to the invention.

The present asynchronous time division communication system includes one or more nodes which are coupled to each other via transmission lines, and in FIG. 1 one of these nodes is represented in more detail. It is of the type described in the above mentioned Belgian patent No. 905982 and includes a switching network BSN with N input terminals I1 to IN and N output terminals O1 to ON. Send circuits IU1/N of N user stations US1/N are connected to input terminals I1/N via respective asynchronous transmission lines IL1/N and respective interface circuits IB1/N; the whilst the output terminals O1/N are connected to receive OU1/N of these user stations US1/N via respective interface circuits OB1/N and respective asynchronous transmission lines OL1/N.

Of the N user stations only US1 to US4 are represented in relative detail because the operation of the communication system will now be explained with the help of a description of a conference telephone communication between the user stations US1, US2 and US3, the fourth user station US4 being used as clock station. In this example synchronous speech data at 64 Kbit/sec. is exchanged between these stations and the clock station US4 provides clock information from which a clock signal at 64 kHz is derived.

To realise such a conference connection the following connections are successfully established:

(1) between US1 and US2;
(2) between US1 and US4;
(3) between US2 and US4;
(4) between US1 and US3;

(5) between US3 and US4.

Because the establishment of the connection US1-US3 is identical to the establishment of US1-US2 and because this is also true for the connections of US1/3 with the clock station US4, only the connections of US1 with US2 and US4 are considered in relative detail. The connection between US1 and US2

As described in the above Belgian patent, No. 905982, during a signalling phase two unidirectional connections are built up between US1 and US2 by the exchange of control packets between these stations. More particularly, the following unidirectional paths are established between US1 and US2:

from IU1 to OU2 via IL1, IB1, BSN, OB2 and OL2;
from IU2 to OU1 via IL2, IB2, BSN, OB1 and OL1.

Once this signalling phase is finished the stations US1 and US2 may start with the exchange of data packets which in the present case contain digital speech information and have a bit rate of 64 Kbit/sec. These data packets are generated in the stations US1 and US2 by the transmitter devices TR1 and TR2 respectively and are transmitted over the transmission lines IL1 and IL2 after the latter have been connected to the transmitter devices by conventional means represented in dotted lines. These data packets are received in the receiver devices RC2 and RC1 of US2 and US1 respectively and via the transmission lines OL2 and OL1 after these lines have been connected to these receiver devices by conventional means, again represented in dotted lines.

However, in the present case the data transmission is delayed until the complete conference connection has been built up.

The connection between US1 and US4

In an analogous way as described above the following unidirectional paths are established between US1 and US4:

from IU1 to OU4 via IL1, IB1, BSN, OB4 and OL4;
from IU4 to OU1 via IL4, IB4, BSN, OB1 and OL1.

Once this signalling phase is finished the station US4 may start with the transmission of packets which in the present case contain clock information. These clock information packets are generated in the station US4 by the clock circuit CLC and transmitted over the transmission line IL4 after the latter has been connected by conventional means, again represented in dotted lines, to this clock circuit CLC. These packets are received in the receiver device RC1 of US1 and via the transmission line OL1 after this line has been connected to this receiver device via not shown but conventional means represented in dotted lines.

Unlike to the data transmission in the stations US1/3 the transmission of clock information need not be delayed the complete conference connection has been built up. In any event, the description of such a transmission operation is only described later.

It should be noted that the clock circuit CLC may generate clock information in various forms the rhythm of the packets transmitted itself may constitute the clock information, or the contents of these packets may contain the clock information.

After the conference connection has been completely built up each of the stations is connected to the three others, so that it may exchange data with two of these stations and receive clock information from the station US4.

To clarify the operation of the communication system, consideration is now more particularly given to the user station US1 which receives speech data packets from US2 and US3 and clock information packets from US4. These speech data packets each have a heading designating the corresponding send and receive stations, whilst the heading of the clock information packets designates the send station US4.

Figure 2:
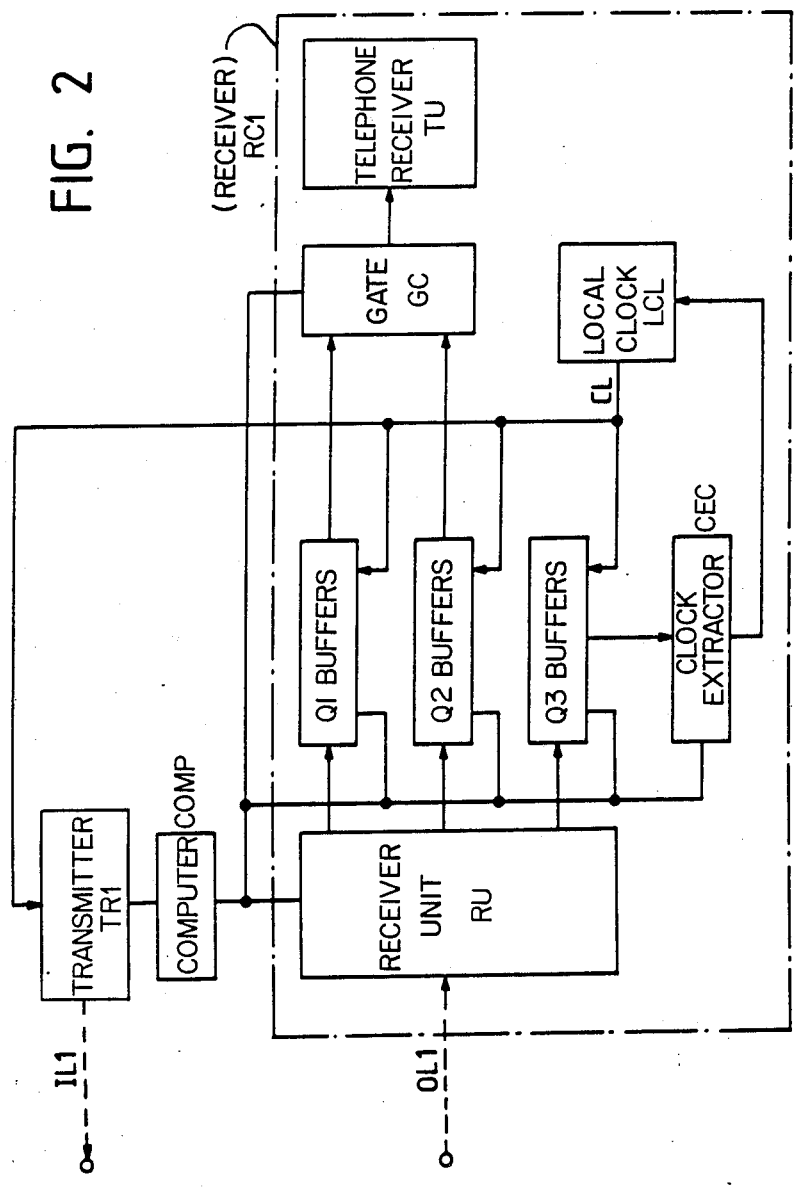
FIG. 2 represents the receive and send circuits RC1 and TR1 of FIG. 1 in more detail.

The transmitter device TR1 and the receiver device RC1 of the user station US1 are represented in detail in FIG. 2. As follows from this figure the receiver device RC1 includes a receiver unit RU controlled by a computer COMP which also controls the transmitter device TR1 which is connected to the transmission line IL1. The receiver unit RU has an input which may be coupled with the transmission line OL1 and a number of outputs which are connected to inputs of queues Q1, Q2 and Q3 respectively. The outputs of the queues Q1 and Q2 are coupled to a telephone receiver unit TU via a gating unit GC, whilst the output of Q3 is connected to a clock extraction circuit CEC. The latter controls a local clock circuit LCL which generates on its output CL a like named clock signal CL controlling the queues Q1 and Q2 as well as transmitter device TR1. The queues Q1 to Q3, the extraction circuit CEC and the gating circuit GC are all connected to the computer COMP.

When speech data packets from US2 and US3, as well as clock information packets from US4 are received in the user station US1, they are stored in the corresponding queues Q1, Q2 and Q3 depending on the transmitter station. For instance, speech data from US1 is stored in Q1, speech data from US3 is stored in Q2 and clock information from US4 is stored in Q3.

The clock information is extracted from the packets stored in the queue Q3 by the clock extraction circuit CEC and used to synchronize the local clock circuit LCL. The clock signal CL generated at the output of this clock circuit or a signal derived therefrom is then used to read the speech data stored in the queues Q1 and Q2.

When the computer COMP finds out that the speech data packets stored in Q1 and Q2 belong to a conference connection, then it controls these queues and the gating circuit GC in such a way that these speech packets are supplied as a stream of digital data having the desired format and timing to the telephone unit TU. Therein these speech packets which are originating from the user stations US2 and US3 are transformed in analog speech.

It should be noted that all packets transmitted, including the clock information packets, are subject in the network to a delay which is not constant. Therefore each receiver unit RU has to contain means to take this stochastic delay into account. These means may for instance be of the type described in Belgian patent No. 903261 (M. De Prycker 1), i.e. such that the data in the queues Q1, Q2, Q3 is subjected to a predetermined delay.

It is clear that various clock means, each providing a different type of clock information, may be provided in a respective number of user stations. In this case each user station may thus select the clock station with which it wishes to be connected. In this way groups of stations may be formed in the system, the stations of each group being mutually synchronized. Also, the clock station US4 instead of itself having self-contained clock means may for instance obtain clock information from clock means present in another clock station once it has been connected to that other clock station.

While the principles of the invention have been described above in connection with specific apparatus, it is to be clearly understood that this description is made only by way of example and not as a limitation on the scope of the invention.

I claim:

1. Asynchronous time division communication system comprising:

a switching network, a first plurality of user stations, and a corresponding first plurality of transmission links for coupling each of said user stations with said switching network whereby each of said user stations may transmit and receive asynchronous data to and from to any other of said user stations via said transmission links and said switching network, wherein at least some of said user stations each further comprise clock extraction means to extract a clock signal from received asynchronous clock information data, and at least one of said first plurality of user stations further comprises means to generate said clock signal and clock output means for generating said clock information from said clock signal and for selectivity transmitting said clock information as asynchronous data via said transmission links and said switching network to one or more of said at least some of said user stations.

2. A communication system according to claim 1, wherein at least two of said at least some of said user stations each further comprise:

clock connection means to establish a clock connection with said at least one station, and data connection means to establish a data connection between a first and another of said at least two user stations whereby synchronous data may be exchanged between said first and another of said at least two user stations in synchronism with said clock signal extracted from said clock information from said at least one user station.

3. Communication system according to claim 2, wherein said clock connection is a conference connection between at least three of said user stations.

4. Communication system according to claim 1, wherein said means to generate a clock signal is self contained within said at least one station.

5. Communication system according to claim 1, wherein at least a first user station and a second user station are included within said some of said user stations, said plurality of user stations includes a third station selectively connected to said at least one user station and said means to generate a clock signal derives said clock signal from clock information from said third user station when it is connected to said at least one station.

6. Communication system according to claim 1, wherein said clock information is in the form of a succession of data packets transmitted at regular intervals to thereby define a period, with the clock information corresponding to the period between succesive transmissions of such clock information data packets.

7. Communication system according to claim 1, wherein said clock information is in the form of a succession of clock information data packets transmitted at regular intervals, with the clock information corresponding to data contained within the clock information data packets.

8. Communication system according to claim 1, further comprising means for generating an alternate clock signal and means for transmitting alternate clock information derived from said alternate clock means to a second user station separate and distinct from said one or more user stations receiving said clock information from said at least one user station, whereby different said at least two user stations may selectively be provided with one of several types of clock information.

9. Communication system according to claim 1, characterized in that each of said at least some of said user stations further comprises first storage means for storing data information and second storage means for storing clock information.

* * * * *

UNITED STATES PATENT AND TRADEMARK OFFICE
CERTIFICATE OF CORRECTION

PATENT NO. : 4,881,223
DATED : November 14, 1989
INVENTOR(S) : Pierre L. Debuysscher It is certified that error appears in the above-identified patent and that said Letters Patent is hereby corrected as shown below:

In the Specification:

Column 1, line 14, change "addition" insert
-- additional --.

Column 1, line 18, before the paragraph beginning with "Such . . ." insert -- BACKGROUND ART --.

Column 1, line 46, after "group" insert
-- synchronously --.

Column 2, line 34, after "detail" change ":" to -- . --.

Column 2, line 48, delete "the whilst".

Column 2, line 49, after "receive" insert -- circuits --.

Column 2, line 58, after "as" insert -- a --.

Column 2, line 64, change "successfully" to
-- successively --.

Column 3, lines 6,7, the phrase "The connection between US1 and US2" should be a subheading.

Column 3, line 52, after "unlike' delete "to".

Column 3, line 54, after "delayed" insert -- until --.

Column 3, line 58, after "forms" insert a colon.

UNITED STATES PATENT AND TRADEMARK OFFICE
CERTIFICATE OF CORRECTION

PATENT NO.   : 4,881,223
DATED        : November 14, 1989
INVENTOR(S)  : Pierre L. Debuysscher It is certified that error appears in the above-identified patent and that said Letters Patent is hereby corrected as shown below:

In the Claims

Column 5, line 16, after "from" delete "to".

Signed and Sealed this

Seventeenth Day of September, 1991

Attest:

HARRY F. MANBECK, JR.

*Attesting Officer*          *Commissioner of Patents and Trademarks*